Feb. 7, 1950
J. D. WALTERS ET AL
2,496,923
TIP STRUCTURE FOR GAS TORCHES
Filed March 21, 1947
2 Sheets-Sheet 2
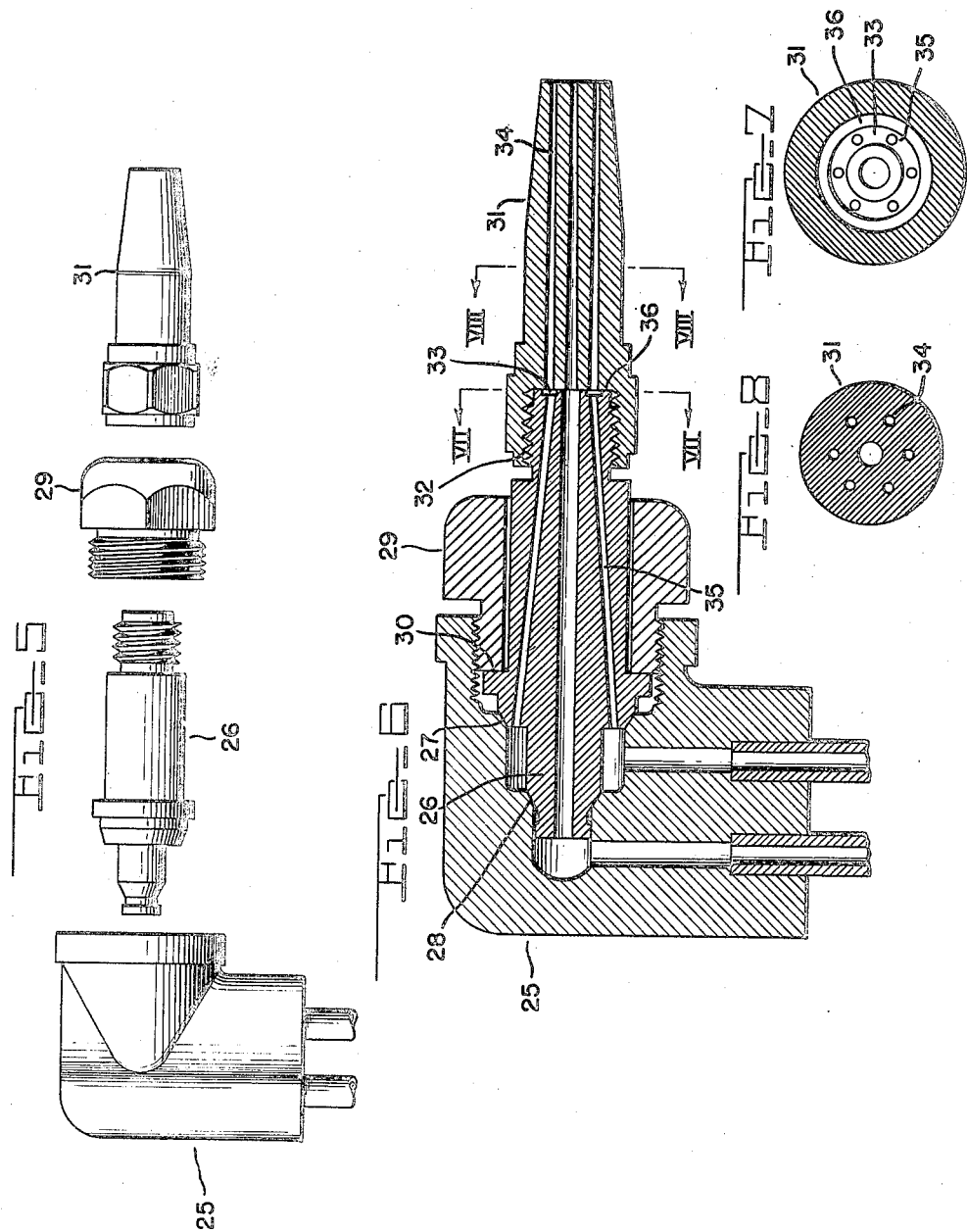
JOHN D. WALTERS, AND INVENTORS
JOSEPH T. MUENZMAY
BY Archworth Martin
ATTORNEY Patented Feb. 7, 1950

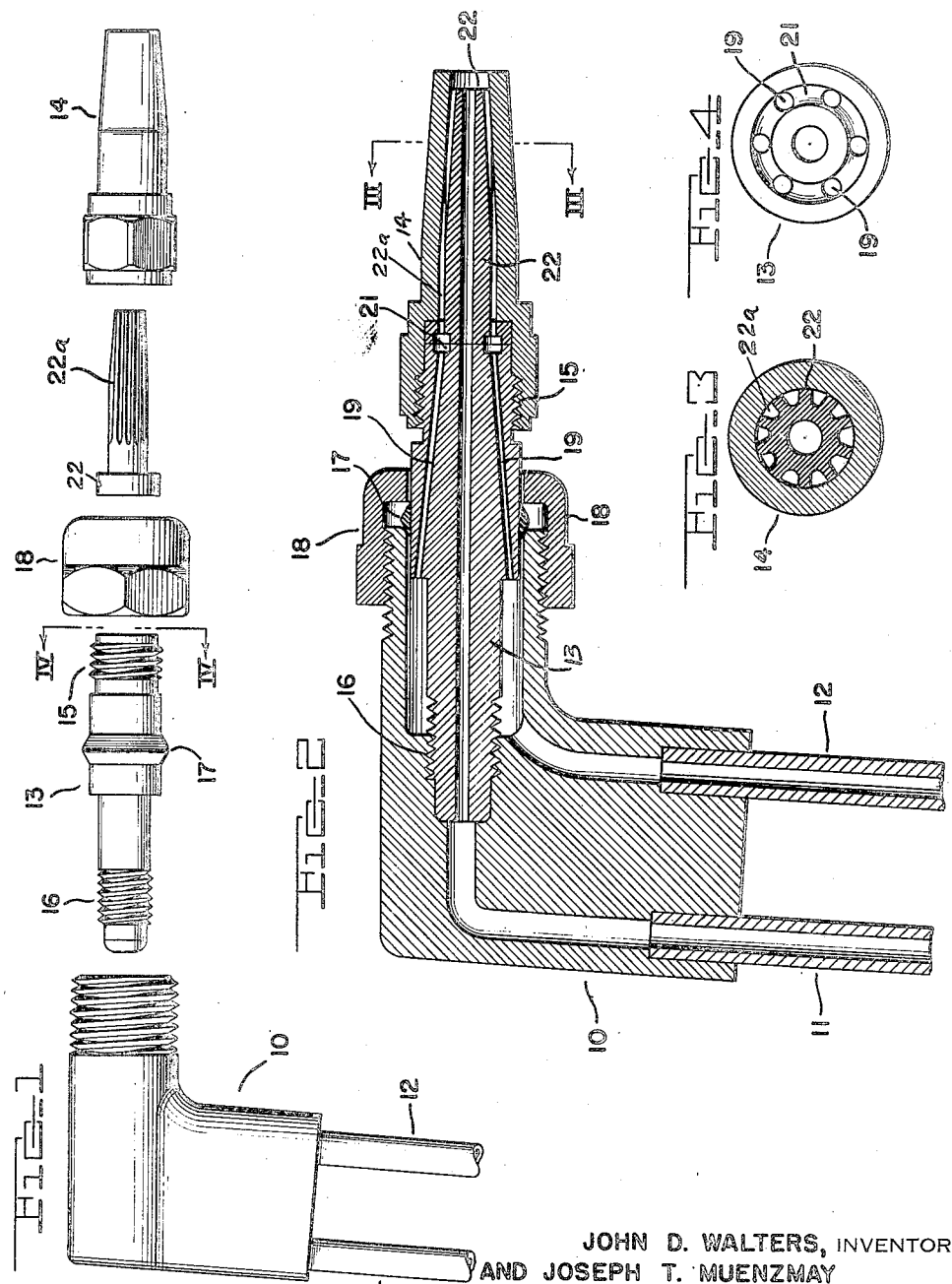

2,496,923

UNITED STATES PATENT OFFICE 2,496,923

TIP STRUCTURE FOR GAS TORCHES

John D. Walters and Joseph T. Muenzmay, Pittsburgh, Pa.

Application March 21, 1947, Serial No. 736,362

1 Claim. (Cl. 158—27.4)

This invention relates to tips for torches used in flame cutting, burning, scarfing, or simply for heating, and is directed more particularly to an improved form of tip structure and connection for use with various standard forms of torch heads through which combustible gases and oxygen are fed, to the tip.

Torch tips usually comprise a mixing chamber portion and a flame-end portion that are formed integrally and are detachably connected to the torch head, so as to permit of replacing a worn tip with new tips, or for the substitution of tips of other forms. Replacement is required frequently, usually necessitating the discarding of the entire tip, although the heating or burning end thereof is the only part that is worn or damaged. There is consequently considerable monetary loss. Also, there is the problem of the workman effecting smooth, tight seating engagement of the new tips with the torch head, with consequent danger of leakage of the gases and oxygen, and perhaps premature mixing of the high-pressure oxygen with the combustible gases, in the torch head.

Briefly stated, our invention involves the making of a torch tip in two parts, namely, the mixing chamber part and the flame-end part. We use the mixing chamber portion as an adapter that, when made to fit a given type of torch head, is thereafter allowed to remain in place, being held permanently on its seat by a tip nut or union nut. The outer end of the adapter is provided with a standard size and form of thread, regardless of the type of torch head with which it is used, and the various flame-end portions of the tip will have similarly-formed threads thereon. Thereafter, when it becomes necessary to replace worn flame-end portions of the tips, such portions can simply be screwed on to the adapter or mixing portion of the tip, no matter what the particular form of torch head is that contains the adapter.

Our invention has for its object the provision of an improved form of torch tip structure wherein the mixing chamber portion thereof is formed separately from the flame end of the tip, these parts being so arranged that the flame end of the tip can readily be connected to and removed from the mixing chamber portion of the tip, without disturbing the mixing chamber portion with respect to its mounting in the torch head.

Some of the forms of torch structures embodying our invention are shown in the accompanying drawings, wherein Figure 1 is an explosion view of the structure of Fig. 2, showing the principal parts of the structure in disassembled relation; Fig. 2 is a longitudinal sectional view through the complete arrangement of torch head and tip structures; Fig. 3 is an enlarged view taken on the line III—III of Fig. 2; Fig. 4 is an enlarged view taken on the line IV—IV of Fig. 1; Fig. 5 is an explosion view showing a modification of the structural parts of Fig. 1; Fig. 6 shows a modification of the structure of Fig. 2; Fig. 7 is an enlarged view taken on the line VII—VII of Fig. 6, and Fig. 8 is an enlarged view taken on the line VIII—VIII of Fig. 6.

Referring first to Figs. 1 to 4, a torch head is indicated by the numeral 10 and is provided with the usual port 11 for high-pressure oxygen and a port 12 for combustible gases that will be united with or be discharged with the oxygen at the flame end of the tip. The torch head may be of any of well known forms, including those having more than two ports for oxygen and combustible gases.

The torch tip instead of having its mixing-chamber portion and its flame-end portion made of a single piece has its basal member 13 and its casing 14 formed separately and having screw-threaded connection with one another at 15. The basal member has a screw threaded engagement at 16 with the torch head and also has a packing gland or ferrule 17 that is slidable on the member 13, into seating engagement with the forward end of the head. A union nut 18 serves not only to push the packing gland to its seat, but serves to brace the member 13 against lateral thrusts that might disturb close-fitting sealing engagement between the member 13 and the torch tip.

When a member 13 formed to fit a particular torch head has been placed in position as shown in Fig. 2, it need not thereafter be disturbed when replacing the flame-end portion of the tip with other ends.

The member 13 has the usual longitudinal ports or passageways 19 that conduct the combustible gases to the forward end of the member 13. In the present instance, the member 13 is shown as having an annular groove 21 at its end face, to receive the gases, and so that the holes 19 need not match up with the longitudinal ports in the member 14 in order to have free flow of the gases through the tip structure.

The casing 14 of the tip is here shown as containing a distal member 22 that has longitudinally extending slots 22a on its peripheral surface to provide ports for the flow of gases from the ports 19. This member 22 need not necessarily be formed separately from the member 14. It will be seen that when the forward end of the tip becomes worn, burned or damaged, all that is necessary is to unscrew the member 14 from the member 13 and to screw a new front tip portion into place.

Referring now to Figs. 5 to 8, a torch head 25 is of somewhat the same form as the torch head 10 but has a somewhat different form of seating and connecting arrangement for the basal member 26 of the tip structure, the member 26 being held to its seats at 27 and 28 by a union nut 29 that has thrust engagement with a flange 30. Here, as in the case of the other arrangement, the member 26 can be retained in firmly seated engagement with its torch tip without the necessity of disturbing it when replacing the distal member 31 of the tip with other flame-end members.

In this case, the member 31 has screw-threaded engagement at 32 with the member 26. Here, also an annular groove 33 in the end of the member 26 serves as a sort of header for the gases, so that it is not necessary to have the ports 34 at the forward portion of the tip line up exactly with the ports 35 in the member 26 when applying the member 31. The annular rib-like wall member 36 at the groove 33 serves as a seating surface to prevent escape of gases at the joint. The surfaces of the abutting ends of the members 26 and 31 are flat, in a diametral plane and when drawn together by the nut 32 give greater resistance to loosening of the joint by lateral thrusts on the member 31, than if the surfaces were tapered.

We claim as our invention:

A gas torch tip comprising a basal member having its rear end shaped for seating engagement with a seat in a torch head and having a central bore for communication with a port in the torch head, the forward portion of the basal member being of substantially greater diameter than its rear portion, whereby an annular space is provided to form a chamber for communication with another port in the head, when the basal member is seated in the head, there being ports extending longitudinally and forwardly through the basal member, in directions that are inclined convergingly toward the axial line of the basal member, there being an annular groove in the forward end of the basal member and surrounding the said bore in position to receive discharge from said ports, a screw-threaded collar that surrounds and connects with the basal member at its larger section, for detachably connecting the basal member to the torch head, a distal member having a central bore for communication with the first-named bore and having a peripheral flange on its rear end and forwardly-extending slots on its exterior surface, the flange having axially-extending ports in position to communicate with said groove, and serving to direct gases from the rear end of the distal member and through the slots to the forward end thereof, and a casing member in overlying relation to said grooves, for the forming of passages, surrounding the distal member and engageable with said flange and having threaded connection with the basal member, to hold the distal member in abutting engagement with the forward end of the basal member, at the areas that surround the said groove.

JOHN D. WALTERS.
JOSEPH T. MUENZMAY.

REFERENCES CITED

The following references are of record in the file of this patent:

UNITED STATES PATENTS

| Number | Name | Date |
| --- | --- | --- |
| 1,731,265 | Quelch | Oct. 15, 1929 |
| 1,733,698 | Rose | Oct. 29, 1929 |
| 1,808,968 | Plumley | June 9, 1931 |
| 1,917,750 | Campbell | July 11, 1933 |
| 1,926,438 | Fausek et al. | Sept. 12, 1933 |
| 1,955,120 | Fausek et al. | Apr. 17, 1934 |
| 1,958,044 | Hendricks | May 8, 1934 |
| 2,157,269 | Richter | May 9, 1939 |